(No Model.)
P. DAVIES.
MEANS FOR SECURING PNEUMATIC TIRES TO WHEEL RIMS.
No. 517,113. Patented Mar. 27, 1894.
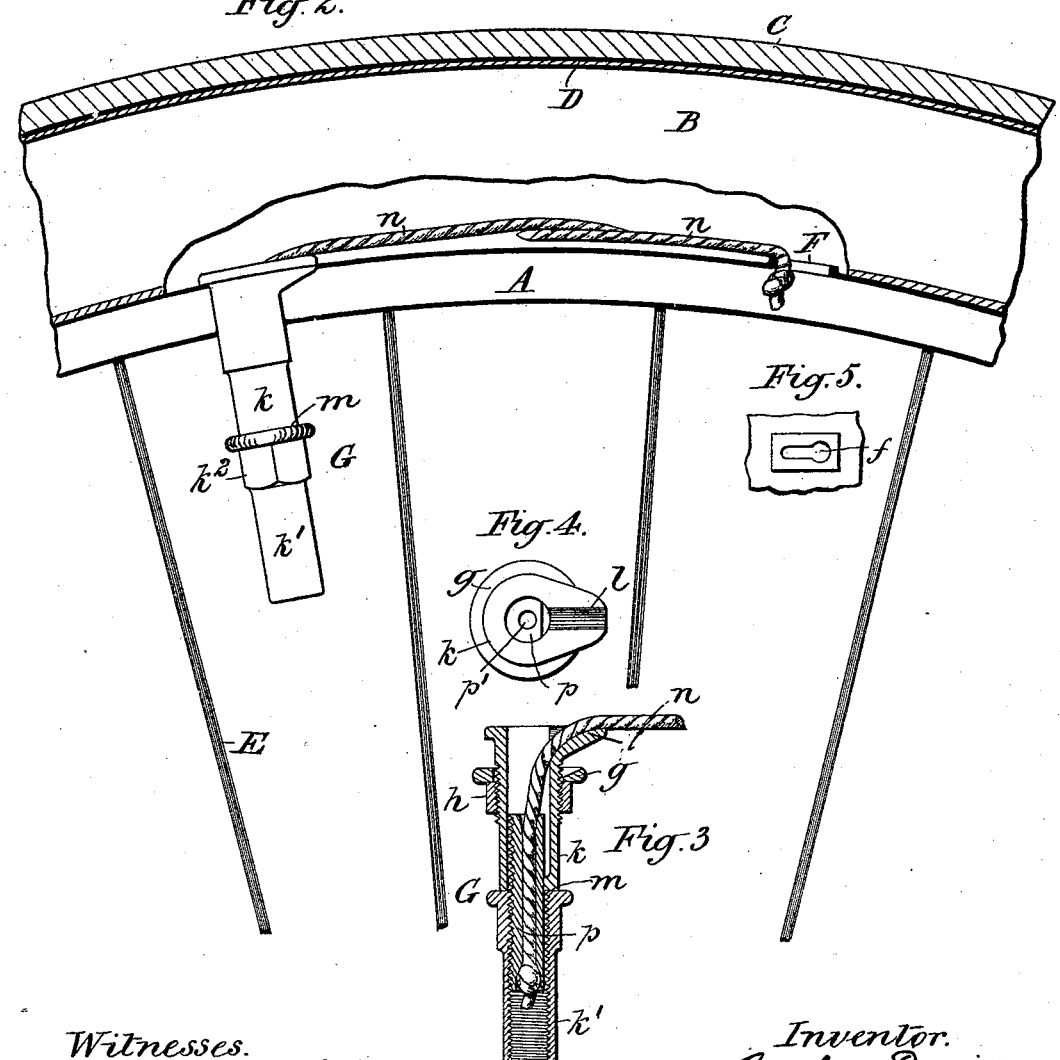
Witnesses.
C. M. Brooke.
B. W. Miller.
Inventor.
Preston Davies,
By his Attorneys,
Baldwin Davidson & Wight.

UNITED STATES PATENT OFFICE.

PRESTON DAVIES, OF LONDON, ENGLAND.

MEANS FOR SECURING PNEUMATIC TIRES TO WHEEL-RIMS.

SPECIFICATION forming part of Letters Patent No. 517,113, dated March 27, 1894.

Application filed September 21, 1893. Serial No. 486,090. (No model.)

*To all whom it may concern:*

Be it known that I, PRESTON DAVIES, a subject of the Queen of Great Britain and Ireland, residing at Town Mead Works, Wandsworth Bridge Road, Fulham, London, England, have invented certain new or Improved Means for Securing Pneumatic and Like Tires to the Rims of Wheels, of which the following is a specification.

My invention has for its object to provide a secure means of attaching and a ready means of detaching the outer casing or jacket of an inflatable tire to and from the rim of a wheel. I attain this object by the mechanism illustrated in the accompanying drawings, in which—

Figure 1 is a cross sectional view of a tire and rim of a velocipede wheel. Fig. 2 is an elevation of part of a similar wheel. Fig. 3 is a longitudinal view mainly in section of the securing mechanism. Fig. 4 is a plan thereof; and Fig. 5 is a detail in the construction.

Referring to the drawings, A is the rim of a wheel of any suitable trough-shaped section and which may be either hollow or solid.

B is the customary inflatable tube.

C is the usual outer casing or tread of rubber or its equivalent.

D is the restraining medium of canvas or the like, preferably formed in one with the tread C and having an annular channel $d$ at each of its edges. E represents the spokes of the wheel.

According to my invention I fix at two points in the center of the trough of the rim a metallic plate, F, (shown in plan in Fig. 5) provided with a key-shaped slot $f$. At a convenient distance from each of the plates F, I fix on the rim a turret-piece G passing it through an opening drilled in the rim and, when a hollow rim is used, it may conveniently be soldered or brazed thereto; when a solid rim is used it may be secured by the collar $g$ and nut $h$, shown in Fig. 3. The stem $k$, of the turret-piece, is lip-shaped at one end and adapted to lie in the trough of the rim and the lip is provided with a sloping groove or channel $l$. The other end $m$ of the stem $k$ is D-shaped in cross-section.

The outer casing or jacket is held in the trough of the rim by means of a wire or equivalent rope $n$ inserted in each of the channels $d$ of the restraining medium D. These wires or equivalent ropes within the edges of the outer casing or jacket encircle the wheel rim and are of a sufficient length to pass out through an opening in the outer casing or jacket and have free overlapping ends for the purpose of permitting circumferential variation as described in the specification of United States patent granted to me, dated November 22, 1892, No. 486,542. One end of each of the wires or ropes is knotted or provided with an enlargement permitting of its passing through the circular end of the slot $f$, in one of the plates F, and held thereunder when drawn along the slot. The other end of the same wire or equivalent rope is passed through the central opening $p'$ of the disconnected plug-piece $p$ (see Figs. 3 and 4) and its extremity enlarged or knotted. This plug-piece $p$ is screw-threaded externally and is fitted to pass loosely through the stem $k$, being prevented from turning by the "flat" on its side as shown in Fig. 4. The stem extension $k'$ of the turret-piece G, is screw-threaded internally and is provided at one end with the hexagonal enlargement and milled-edged flange $k^2$, as shown. The plug-piece $p$ engages with the stem-extension $k'$ and upon being turned operates to take up the slack of the wire or equivalent rope and to firmly secure the tire to the wheel rim.

What I claim, and desire to secure by Letters Patent, is—

The combination with the rim of a wheel, and a pneumatic tire, of the turret piece G, comprising the stem $k$, its extension $k'$, a screw-threaded plug piece $p$, extending into the bore of the stem $k$ and extension $k'$, a rope or wire detachably secured at one end to the rim and attached to the tire and also secured to the plug-piece $p$, and means for adjusting the plug-piece to tighten and loosen the rope.

In testimony whereof I have hereunto subscribed my name.

PRESTON DAVIES.

Witnesses:
A. F. SPOONER,
EDMUND S. SNEWIN.